United States Patent [19]

Stöhr

[11] Patent Number: 4,932,515

[45] Date of Patent: Jun. 12, 1990

[54] SHAVINGS CONVEYOR

[75] Inventor: Albert Stöhr, Markt Schwaben, Fed. Rep. of Germany

[73] Assignee: Gebr. Hennig GmbH, Ismaning, Fed. Rep. of Germany

[21] Appl. No.: 199,115

[22] Filed: May 26, 1988

[30] Foreign Application Priority Data

Jun. 1, 1987 [DE] Fed. Rep. of Germany ....... 3718321
Oct. 20, 1987 [DE] Fed. Rep. of Germany ....... 3735402

[51] Int. Cl.⁵ .............................................. B65G 17/10
[52] U.S. Cl. ................................... 198/822; 198/838; 198/845; 198/853
[58] Field of Search ............... 198/822, 853, 838, 845, 198/525, 836

[56] References Cited

U.S. PATENT DOCUMENTS

| | | | |
|---|---|---|---|
| 2,416,634 | 2/1947 | McBride | 198/822 |
| 2,725,975 | 12/1955 | Franz | 198/822 |
| 3,233,722 | 2/1966 | Jorgensen | 198/822 |
| 3,331,490 | 7/1967 | Daniels | 198/822 |
| 3,374,880 | 3/1968 | Hohl | 198/822 |
| 3,690,445 | 9/1972 | Ouska | 198/822 |
| 3,726,569 | 4/1973 | Maglio et al. | 198/853 X |
| 3,773,166 | 11/1973 | Nowacki | 198/822 X |
| 3,866,743 | 2/1975 | Jorgensen | 198/822 |
| 3,970,190 | 7/1976 | Kovats | 198/822 |
| 4,155,444 | 5/1979 | Kovats | 198/822 |
| 4,770,291 | 9/1988 | Shaw | 198/822 X |

FOREIGN PATENT DOCUMENTS

| | | | |
|---|---|---|---|
| 1152082 | 8/1963 | Fed. Rep. of Germany | 198/822 |
| 0821643 | 12/1937 | France | 198/822 |
| 1108899 | 1/1956 | Japan | 198/822 |
| 0111906 | 9/1944 | Sweden | 198/822 |

Primary Examiner—David A. Bucci
Assistant Examiner—D. Glenn Dayoan
Attorney, Agent, or Firm—Thomas & Kennedy

[57] ABSTRACT

The invention relates to a shavings conveyor, consisting of a hinged belt and two side plate chains, in which the rims of the hinged belt at the same time form the inner side plates of the two side plate chains and the height of these inner side plates is chosen so as to be greater than the height of the rollers of the side plate chains, so that a lateral definition of position of the shavings conveyor with respect to the stationary guide profile is produced in the lower and upper run of the hinged belt.

16 Claims, 6 Drawing Sheets

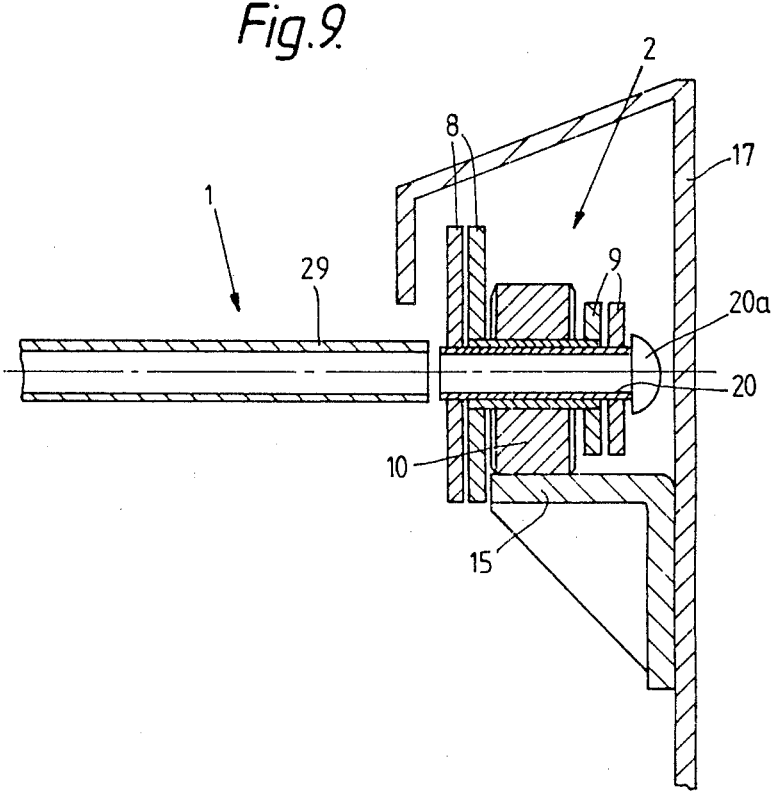

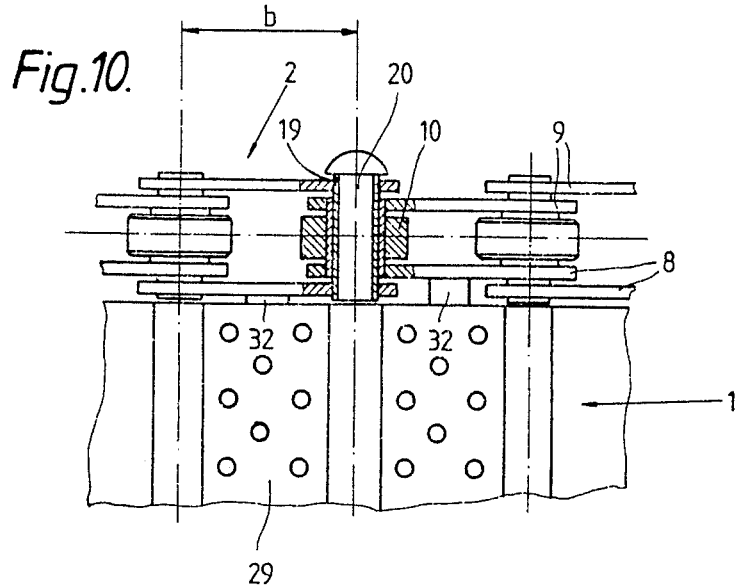
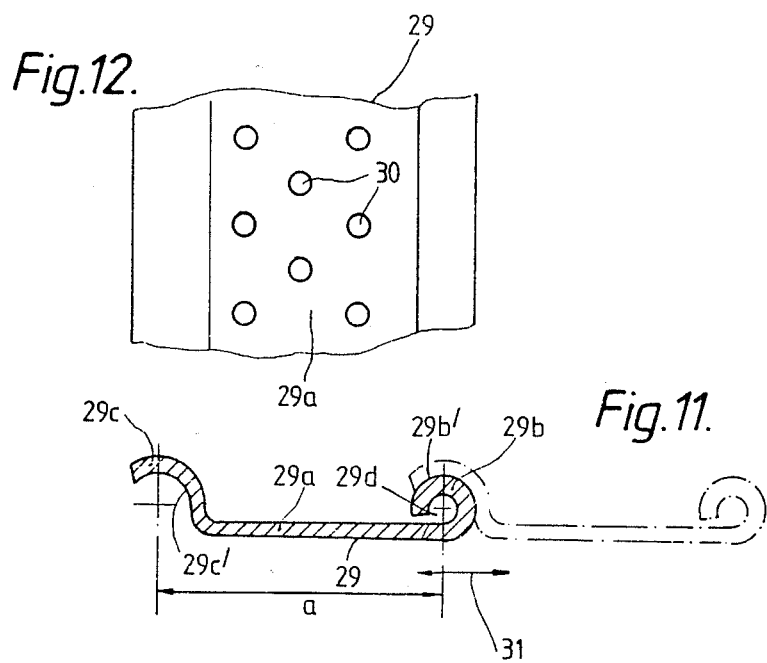

SHAVINGS CONVEYOR

The invention relates to a shavings conveyor for transporting shavings and the like, which includes hinged belt members with side chains having plates that extend to a level higher than the belt members to define a carrying space for the shavings on the hinged belt members.

An object of the invention is to construct a shavings conveyor in such a way that it is distinguished by a simple construction, a large width of the hinged belt which can be used for conveying shavings and excellent guiding on the stationary guide profile.

BRIEF DESCRIPTION OF THE DRAWINGS

Some embodiments of the invention are illustrated in the drawings, in which:

FIG. 9 shows a section through a further embodiment of a joint bolt and the adjacent part of the conveyor housing.

FIG. 10 shows a partial plan view partially in section, of adjacent hinged belt members and side plate chains of another embodiment of the shavings conveyor.

FIG. 11 shows a side cross sectional view of adjacent hinged belt members of another embodiment of the shavings conveyor.

FIG. 12 shows a detail of one hinged belt member.

DETAILED DESCRIPTION

Figure 1:
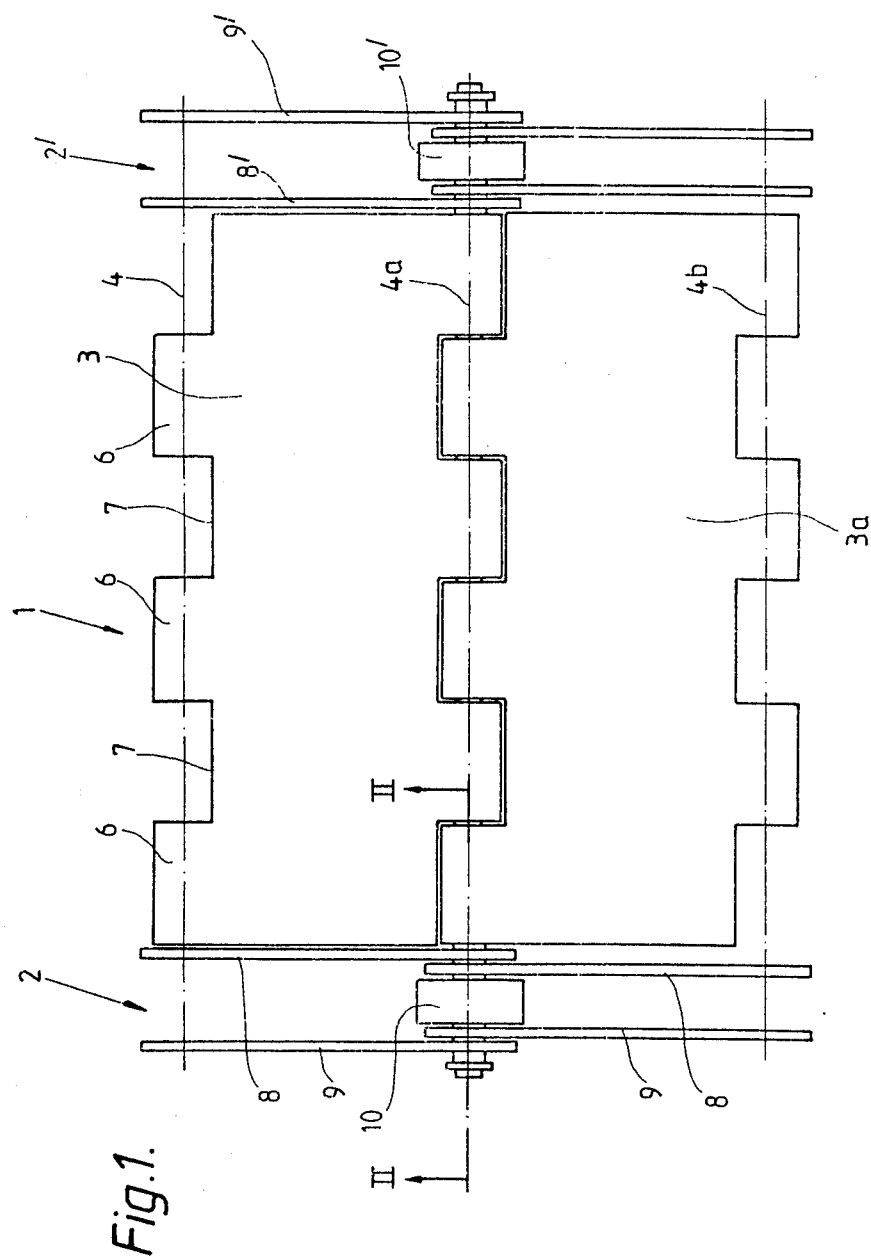
FIG. 1 shows a plan view of adjacent hinged belt members of a shavings conveyor according to the invention.
Figure 2:
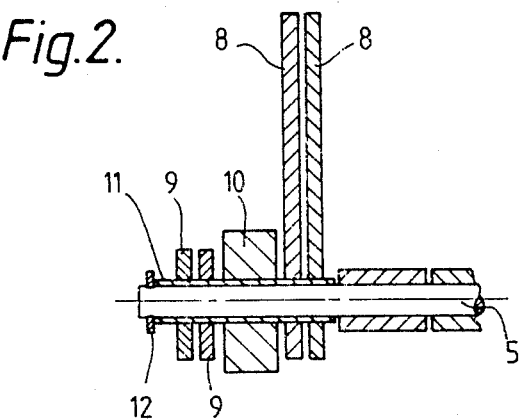
FIG. 2 shows a section along the line II—II in FIG. 1 through a joint of the shavings conveyor.

The shavings conveyor which is illustrated schematically in FIGS. 1 and 2 consists essentially of a hinged belt 1 and two side plate chains 2, 2' arranged on both sides of the hinged belt 1.

The hinged belt 1 is composed of individual hinged belt members 3, 3a etc. which are connected to one another so as to be hinged in the region of their joint axes 4, 4a, 4b etc. by joint bolts 5.

The hinged belt members 3, 3a are provided with bush-like projections 6 which serve to receive the joint bolt 5 and have recesses 7 between them in which the bush-like projections 6 of the adjacent hinged belt member engage.

Rims are provided for lateral definition of the shavings conveyor track formed by the hinged belt members 3, 3a and at the same time form the inner side plates 8, 8' of the two side plate chains 2, 2'.

The side plate chains 2, 2' also contain outer side plates 9, 9' and rollers 10, 10'.

The hinged belt 1 and the two side plate chains 2, 2' have the same axial pitch and have common joint bolts 5. Bushes 11 through which the joint bolts 5 are passed and on which the rollers 10, 10' are mounted are provided in the region of the side plate chains 2, 2'. Locking washers 12 placed on the joint bolts 5 ensure that the hinged belt 1 and the side plate chains 2, 2' hold together.

As can be seen from FIG. 2, the inner side plates 8, 8' of the side plate chains 2, 2' have a greater height than the outer side plates 9, 9'. In this way the shavings conveyor has the necessary conveying volume.

The omission of the inner side plates of the two side plate chains which were used in the past in addition to the rims of the hinged belt increases the useful width of the hinged belt 1 which is available for conveying shavings. At the same time the construction of the shavings conveyor is simplified, and there is a marked reduction in the weight.

Figure 3:
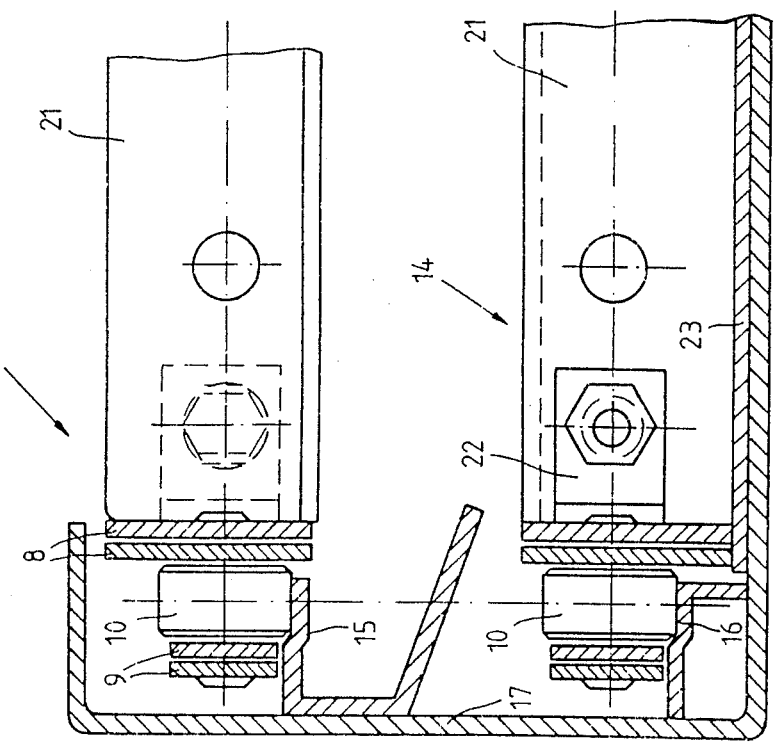
FIG. 3 shows a section through a shavings conveyor constructed as a scraper conveyor.

In the embodiment according to FIG. 3 the shavings conveyor is constructed as a scraper conveyor. It is arranged in a housing 17 which has one guide profile 15 or 16 each for the upper and lower runs of the shavings conveyor. The rollers 10 of the shavings conveyor run on this guide profile.

The inner side plates 8 project upwards or downwards respectively over the rollers 10 both on the upper surface and on the lower surface of the hinged belt. They can therefore serve both in the upper run 13 and in the lower run 14 of the shavings conveyor for lateral definition of the position of the shavings conveyor with respect to the stationary guide profile 15 or 16.

In the shavings conveyor according to FIG. 3, which is constructed as a scraper conveyor, the individual hinged belt members are provided with scraper bars 21 which are connected to the inner side plates 8 by means of angle plates 22 and are of a height which corresponds to the height of the inner side plates 8. Accordingly in the region of the lower run 14 the scraper bars 21 brush against a stationary abrasion belt 23 arranged on the base of the housing 17 and convey the shavings lying on this abrasion belt 23.

Figure 4:
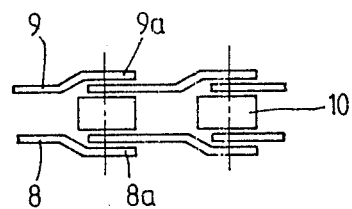
FIGS. 4 and 5 shows plan views of two side plate chains of differing construction.
Figure 5:
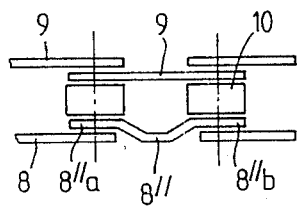

In the embodiment according to FIG. 1 the inner and outer side plates 8, 9 are of flat construction. By contrast. FIGS. 4 and 5 show two further variants of the construction of the side plates: According to FIG. 4 the inner and outer side plates 8, 9 have a bend 8a or 9a respectively corresponding to the thickness of the side plates. In the embodiment according to FIG. 5 the inner side plates 8, 8" are alternately straight or provided with a bend 8"a, 8"b at both ends. In this embodiment the outer side plates 9 are all straight.

The use of bent side plates results in stop zones which determine the relative pivoting movement of adjacent hinged belt members and thus the minimum radius of curvature of the hinged belt.

Figure 6:
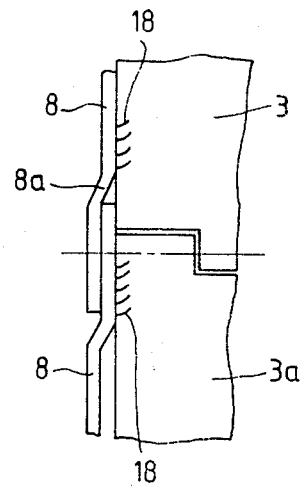
FIGS. 6 and 7 show partial plan views of two further variants of adjacent hinged built members of shaving conveyors, FIG. 8 show a section through a further embodiment of a joint bolt of the shavings conveyor.

FIG. 6 illustrates an embodiment in which the hinged belt members 3, 3a are firmly connected, preferably welded (weld seams 18) to the inner side plates 8 of the hinged belt 1.

Figure 7:
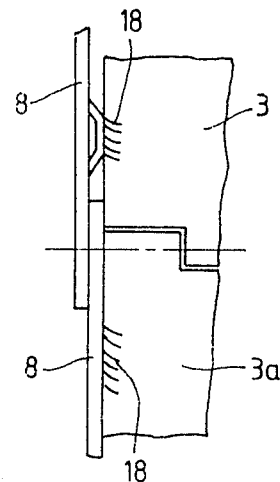

Whereas FIG. 6 shows a variant with bent side plates, FIG. 7 illustrates an embodiment in which the inner side plates are of flat construction and are also connected to the hinged belt members 3, 3a by welding (weld seams 18).

Figure 8:
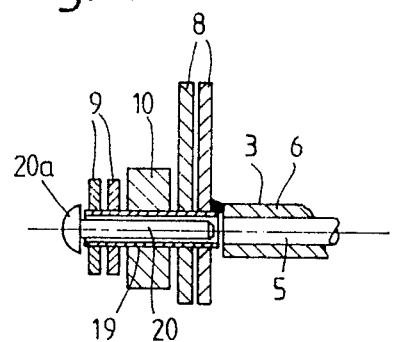

Whereas in the embodiment according to FIGS. 1 and 2 the hinged belt 1 and the two side plate chains 2, 2' have common joint bolts 5 passing through them, FIG. 8 shows an embodiment in which the joint bolts 5 only have a width which corresponds to the width of the hinged belt; thus they do not project laterally over the hinged belt members 3, 3a. The hinged belt members 3, 3a are welded to the inner side plates 8, 8'. The inner and outer side plates 8, 8', 9, 9' and the rollers 10, 10' of the two side plates 2, 2' are mounted on separate bushes 19 which are arranged in axial extension of the joint bolts 5.

After the hinged belt members 3, 3a have been welded to the inner side plates 8, 8', the joint bolts 5 can be secured against axial displacement by pressing or squeezing the bush-like projections 6 of the hinged belt members which surround the joint bolts 5.

Another possibility illustrated in FIGS. 8 and 9 consists of driving a plastic bolt 20 into the bush 19 for axial securing of the joint bolt 5 in position. The head 20a of this plastic bolt 20 which projects outwards can be used at the same time for limiting and guiding the shavings conveyor and for this purpose can contact and co-operate with a stationary guide track or housing.

In the further embodiment of the invention which is illustrated in FIGS. 9 to 12 the hinged belt 1 is constructed without joint bolts.

The hinged belt 1 consists of individual hinged belt members 29 which are of similar construction and have openings 30 provided in the central region 29a thereof through which fluid adhering to the conveyed shavings can drip. On the two edges which run at right angles to the conveying direction (arrow 31, FIG. 11), the hinged belt members 29 have joint axis parts 29b, 29c which extend over the entire width of the hinged belt 1. The joint axis part 29b is provided with a part-cylindrical outer surface 29b' and the joint axis part 29c is provided with a part-cylindrical inner surface 29c' of complementary construction. Thus adjacent hinged belt members 29 engage in or over one another in the manner shown in FIG. 11.

The axial spacing a between the joint axis parts 29b, 29c of the individual hinged belt members 29 corresponds to the axial spacing b of the side plate chains 2, 2', and the joint axes of the hinged belt 1 and the side plates 2, 2' coincide in their positions.

The hinged belt members 29 are connected to the inner side plate 8 adjacent to them, for example by welding, screwing or riveting. Projections 32 which serve to connect the hinged belt members 29 to the side plates 8 are indicated schematically in FIG. 10.

Thus in this embodiment too the inner side plates 8 of the two side plate chains at the same time form the rims of the hinged belt 1.

In this embodiment too plastic bolts 20 are arranged in the bushes 19 of the side plate chains and the heads 20a of the plastic bolts can serve for lateral definition of the position of the shavings conveyor inside the housing 17 in addition to the lateral definition of position produced by the inner side plates 8 coming to rest on the guide profile 15 or 16.

Figure 13:
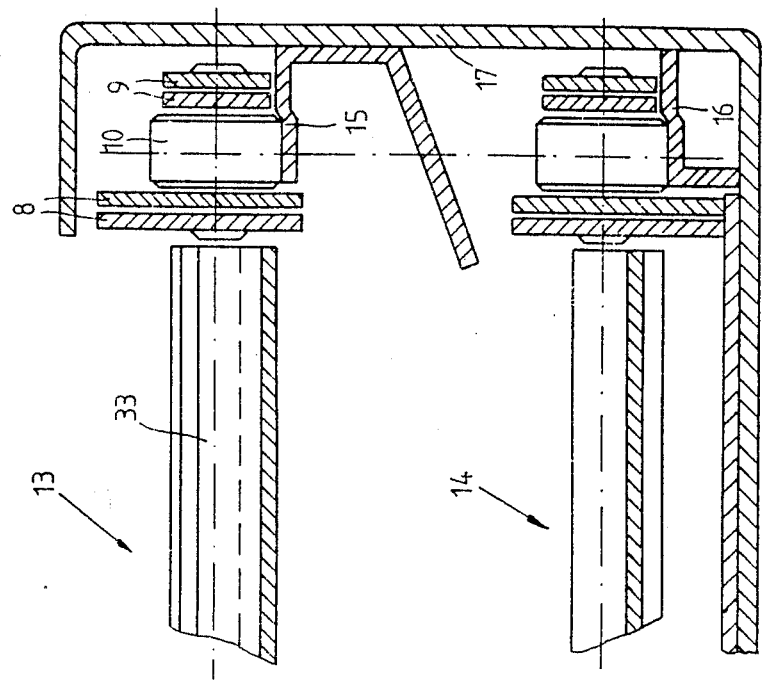
FIG. 13 shows a section through an embodiment of the shavings conveyor constructed as a conveyor belt.

As can be seen from FIGS. 3 and 13, the guide profiles 15, 16 are also of stepped construction, so that a further lateral definition of the position is produced by the steps in the guide profiles 15, 16 co-operating with the rollers 10.

The shavings conveyor according to the invention can be produced in two different constructions or converted in a simple manner by the user, using the same basic components and using the same housing, depending upon the desired application:

on the one hand as a scraper conveyor (FIG. 3), the scraper bars 21 of which point downwards and cooperate with the housing base.

on the other hand as a conveyor belt (FIG. 13) which is operated in the reverse direction and conveys the shavings on the upper run 13 of its hinged belt which is provided with suitable carrier ribs 33.

A comparison of FIGS. 3 and 13 shows that the housing 17 and the guide profiles 15, 16 are constructed in such a way that a scraper conveyor (FIG. 3) or a conveyor belt (FIG. 13) can be used as required, a side plate chain of the same construction being used in either case.

I claim:

1. A shavings conveyor of the type including a housing (17), a hinged belt assembly (1) supported in the housing and including a continuous series of belt members (3, 21, 29) hingedly connected together at adjacent edges, side plate chains (2, 2') connected to and straddling the belt members and extending along the length of the series of belt members, the side plate chains each including a series of inner chain plates (8) joined end-to-end to one another and positioned adjacent the belt members, outer chain plates (9) joined end-to-end to one another and positioned outboard of said inner chain plates remote from the belt members, and a roller assembly (10) positioned between the inner chain plates and the outer chain plates at their ends, the inner and outer chain plates of the side chains and the belt members having the same axial pitch, the housing including guides on which the roller assemblies are movably supported, the improvement therein of the inner chain plates (8) being of a height greater than the height of the roller assemblies (10), with the inner chain plates (8) projecting to heights above and below the rollers to provide lateral definition of the space adjacent the belt members and forming rims about the space adjacent said hinged belt members.

2. A shavings conveyor as claimed in claim 1, in which the rims (8, 8') of the hinged belt (1) are positioned adjacent opposed sides of the hinged belt members (3, 3a), and further comprising common joint bolts (5) passing through the hinged belt (1) and the two side plate chains (2, 2').

3. A shavings conveyor as claimed in claim 1, wherein the hinged belt members (3, 3a) are firmly connected to the rims (8, 8') of the hinged belt (1).

4. A shavings conveyor as claimed in claim 3, wherein the hinged belt members (3, 3a) are connected to one another by joint bolts (5), and wherein the joint bolts (5) have a maximum length equal to the width of the hinged belt (1) and wherein the rollers (10, 10') of the side plate chains (2, 2') are mounted to the chain plates (8, 8', 9, 9') by bushes (19).

5. A shavings conveyor as claimed in claim 4, wherein the hinged belt members (3, 3a) are welded to the rims (8, 8') and wherein the joint bolts (5) are secured against axial displacement by compressing a bush-like projection (6) which surrounds the joint bolt.

6. A shavings conveyor as claimed in claim 4 wherein the joint bolts (5) are coaxially aligned with the bushes (19) and wherein the joint bolts (5) are secured against axial displacement by plastic bolts (20) driven into the bushes (19).

7. A shavings conveyor as claimed in claim 6, wherein the plastic bolt (20) has a rounded head (20a) which projects outwardly over the bushes (19) and forms a limiting guide for the shavings conveyor.

8. A shavings conveyor as claimed in claim 1, wherein the inner and outer chain plates (8, 8', 9, 9') are of flat construction.

9. A shavings conveyor as claimed in claim 1, wherein the inner and outer chain plates (8, 8', 9, 9') each have a portion offset a distance greater than the thickness of a chain plate.

10. A shavings conveyor as claimed in claim 1, wherein successive inner chain plates (8, 8'') are alternately straight and bent and wherein the outer chain plates (9) are all of straight construction.

11. A shavings conveyor for use with a stationary guide comprising a series of duplicate belt members positioned adjacent one another to form an elongated belt assembly, a joint bolt extending across the length of said belt assembly at adjacent edges of said belt members and connecting together adjacent ones of said belt members, side chains positioned on opposite sides of said belt assembly, said side chains each including inner and outer side plates, said inner side plates each positioned adjacent its belt member and said outer side plates each positioned outboard of said inner side plates remote from its belt member, rollers mounted between the inner and outer side plates, said inner side plates being of greater height than said outer side plates and extending above and below said rollers to cooperate with the stationary guide to provide a means for laterally locating said belt members with respect to the stationary guide, and said inner side plates forming a space over said belt members to receive and transport shavings and the like.

12. A shavings conveyor as claimed in claim 11, wherein the belt members (29) have joint axis parts (29b, 29c) which extend over the entire width of the belt and of which one joint axis part is provided with a part-cylindrical outer surface (29b') and the other joint axis part is provided with a part-cylindrical inner surface (29c') of complementary construction.

13. A shavings conveyor as claimed in claim 11 wherein said belt members are rigidly connected to said side chains.

14. A shavings conveyor as claimed in claim 11 wherein said rollers are mounted to said side plates by bushes, said joint bolts are coaxially aligned with said bushes and said joint bolts are secured against axial displacement by plastic bolts within said bushes.

15. A shavings conveyor as claimed in claim 11 wherein said inner side plates each have a portion adjacent one end thereof offset a distance at least as great as the thickness of said inner side plate.

16. A shavings conveyor as claimed in claim 11 wherein successive inner side plates are alternately straight at both ends and offset at both ends.

* * * * *